Nov. 25, 1958  J. M. TOWLER  2,861,426
CONTROL VALVES FOR HYDRAULIC PRESSES
Filed Aug. 17, 1955  6 Sheets-Sheet 1

INVENTOR
JOHN MAURICE TOWLER, DECEASED
BY FRANK HATHORN TOWLER, EXECUTOR
BY
Carlson, Pitzner, Hubbard & Wolfe
ATTORNEYS

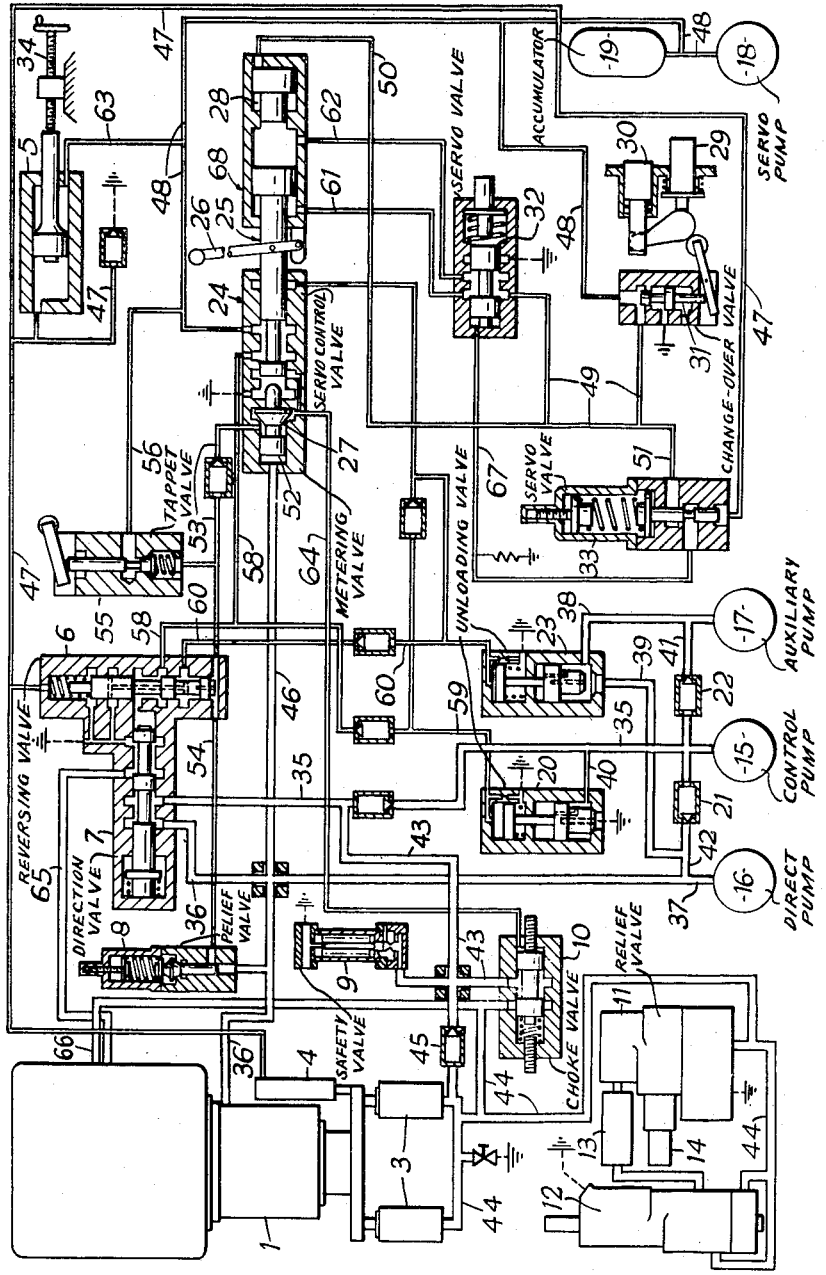

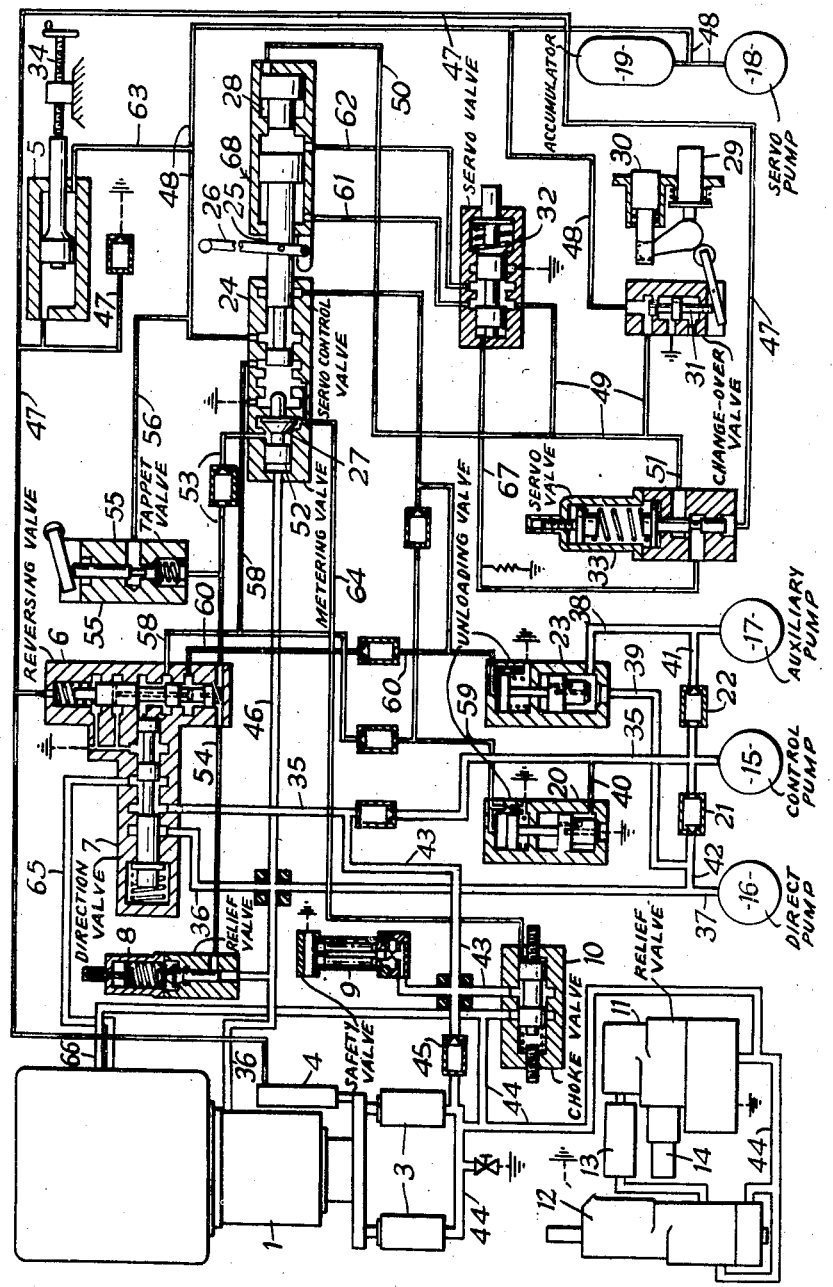

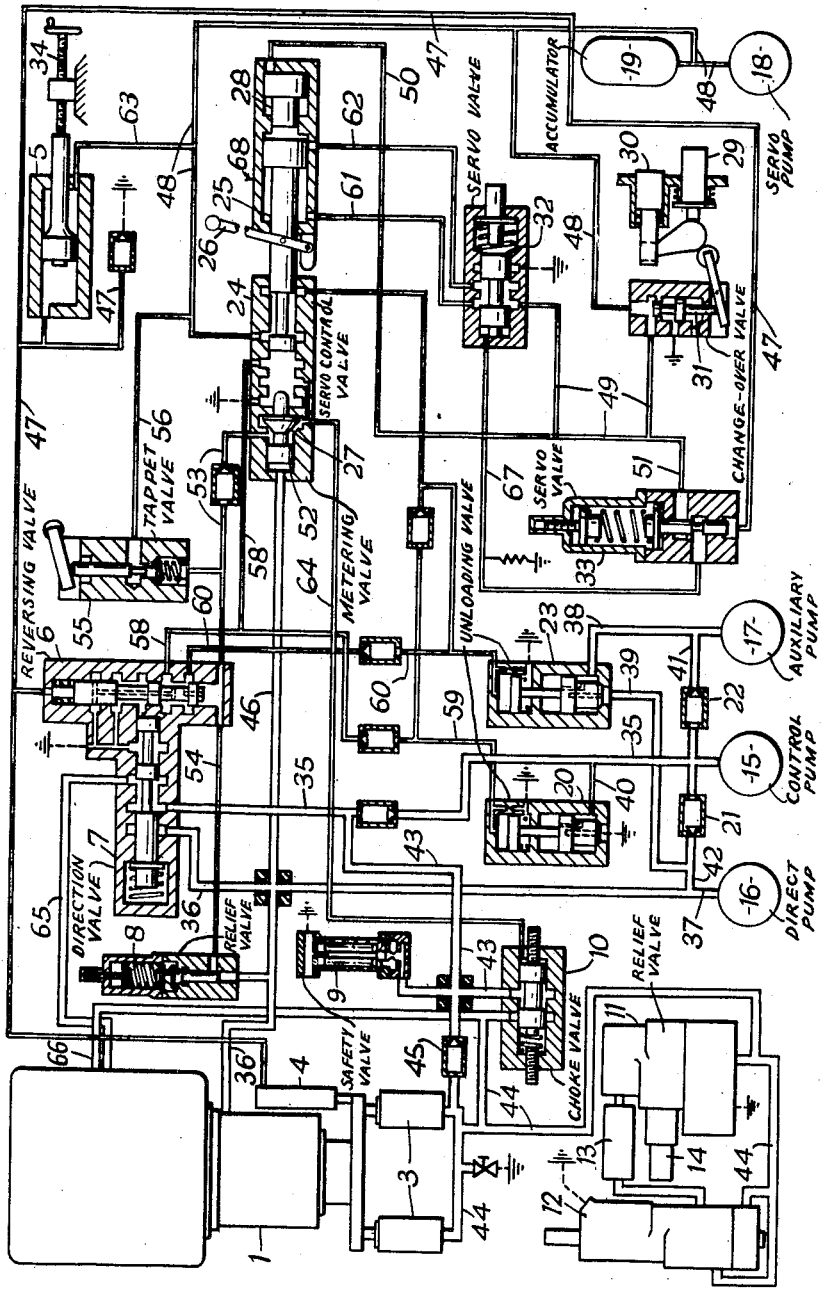

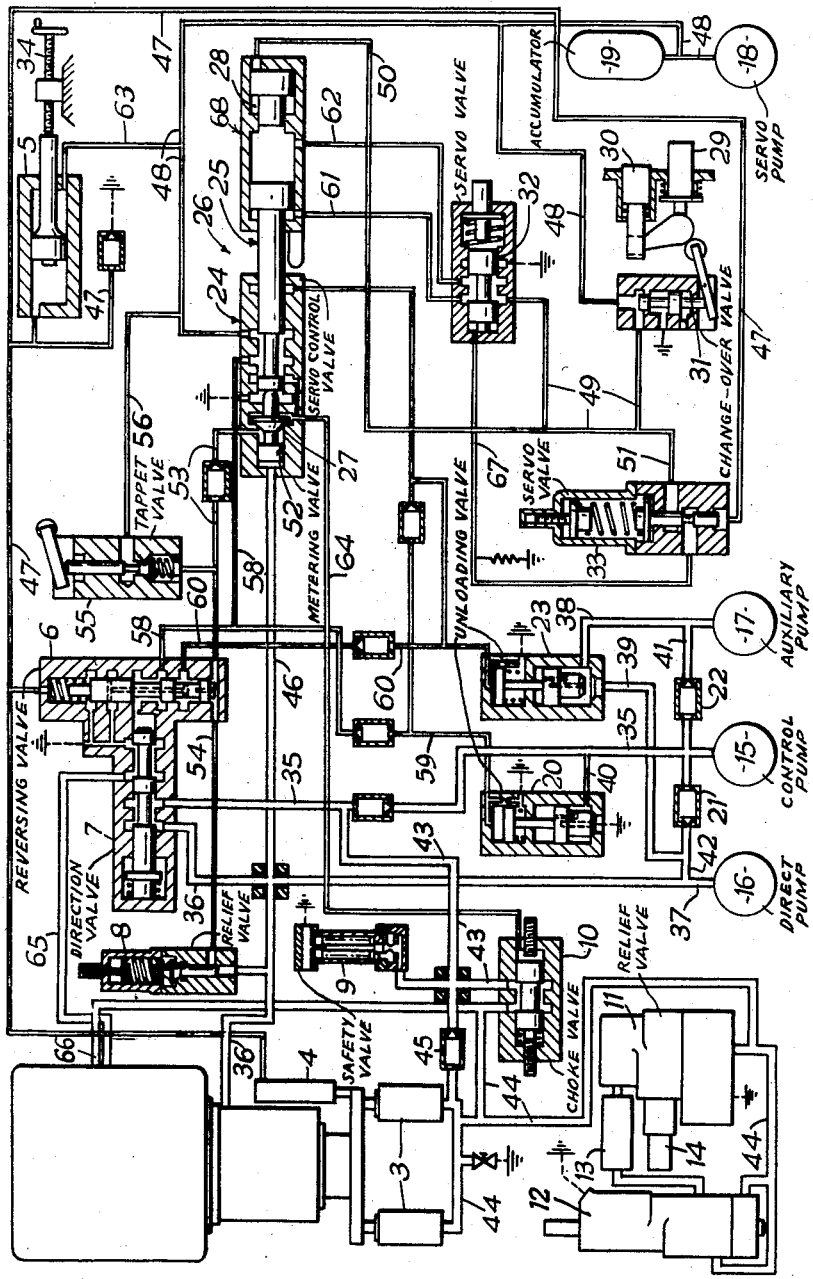

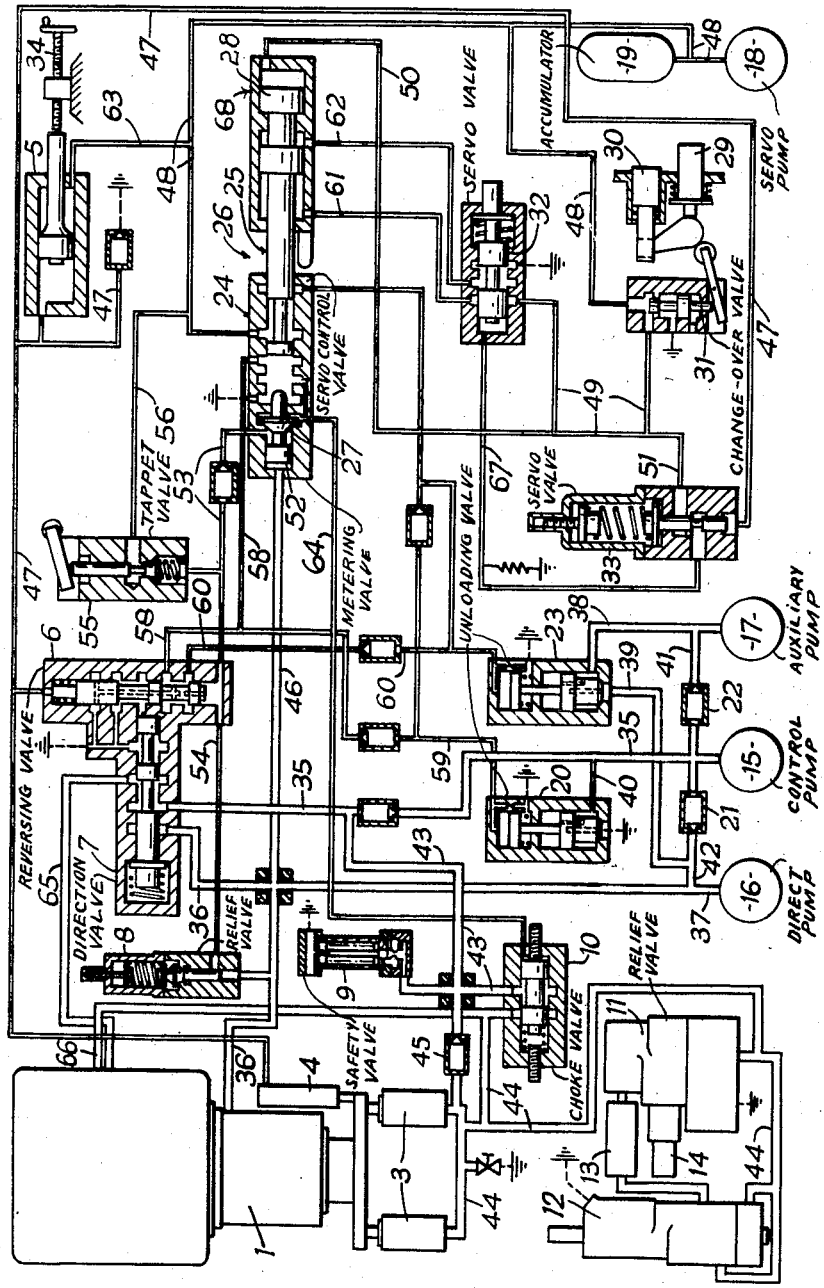

United States Patent Office 2,861,426
Patented Nov. 25, 1958

2,861,426

CONTROL VALVES FOR HYDRAULIC PRESSES

John Maurice Towler, deceased, late of Mayfair, London, England, by Frank Hathorn Towler, executor, Dob Park, England, assignor to Electraulic Presses Limited, Rodley, near Leeds, England, a limited liability company of Great Britain Application August 17, 1955, Serial No. 528,868

Claims priority, application Great Britain August 21, 1954

12 Claims. (Cl. 60—52)

This invention relates to control valves for hydraulic presses and particularly for direct-hydraulic presses of the type in which the pressure liquid for the operating stroke and return stroke of the hydraulic press is directly supplied by hydraulic pumps without the interposition of a hydraulic accumulator. Nevertheless it will be understood that a hydraulic accumulator may be used for auxiliary operations or to operate the control valves.

In particular this invention relates to control valves for direct hydraulic forging and swaging presses in which it is desired to make a series of rapidly repeated short planishing strokes in addition to normal forging strokes.

The invention also relates to control valves for direct hydraulic presses for such operations as forging, coining, or forming, in which it is desired to secure almost instantaneous reversal of the press ram upon completion of the pressing operation, or at a point controlled by the operator.

One object of this invention is to simplify the construction of the valves and to separate the primary-pressure control valves from the pilot-pressure control valves, so that the primary-pressure valves may be mounted on or near their associated press cylinders thereby employing less large bore high pressure piping, most of the pilot-pressure valves being mounted in a control panel conveniently located to suit the press operator.

Another object of this invention is to provide means for operating large hydraulic forging presses and like presses in which a large pump capacity is required to effect the return stroke, the said means being so arranged that only a part of the said pump capacity passes through the directional control valve, with the result that only a comparatively small directional control valve is required to control the movement of the press ram even when considerable additional pump capacity is employed to provide both a high pressing speed and a high return speed.

A further object of this invention is to provide a servo-actuated directional control valve of simple construction for the control of hydraulic forging presses and like presses, the said control valve having only two operative positions, "forward" and "return," and servo-controlled by a simple reversing valve.

It will be appreciated that the operating cycle of a hydraulic press commences from the "return" position and therefore it is an object of this invention to provide a directional control valve and a reversing valve operating in combination and so designed that the directional control valve is spring-actuated to the "return" position and the reversing valve is spring-actuated to the "forward" position immediately servo-pressure is interrupted or released, thereby ensuring that the said valves are both in the correct position for the commencement of the operating cycle.

It is a further object of this invention to provide a reversing valve so constructed that it may be actuated by an impulse of servo pressure supplied by a manually-operated or tappet-operated valve for reversing the press ram when a predetermined position is reached or actuated by an impulse of primary pressure from the overblow of a relief valve in order to reverse the press ram at a predetermined pressure, the said reversing valve being provided with what might be termed a "hydraulic detent" in that it is held in the "return" position (to return the press ram) by servo pressure. It will be understood that the said reversing valve may be so designed to be actuated by an impulse of primary pressure if so desired without departing from this invention.

Another object of this invention is to provide a combination of valves such that a hydraulic press may be manually-operated to do work such as planishing and forging, but it may be push-button-operated to do work such as closed-die forging.

Broadly the present invention consists in control means for a hydraulic forging press of the kind specified comprising in combination a directional control valve, the valve member of which is moved in one direction by hydraulic pressure and in the opposite direction by opposing spring pressure and a reversing valve the valve member of which is also moved in one direction by hydraulic pressure against opposing spring pressure, said directional control valve being adapted to control the flow of pressure liquid to the prefill valve of the press to allow the press ram to make its return stroke and said reversing valve being adapted to control the flow of pressure liquid serving to operate the directional control valve the arrangement being such that the valve members of both valves will be spring actuated to bring the same into the correct positions for the commencement of an operating cycle of the press immediately the hydraulic pressure on said valve members is interrupted or released.

In order that the invention may be clearly understood and carried into effect a complete hydraulic system constituting a preferred embodiment of the invention will now be described by way of example by aid of the accompanying diagrammatic drawings in which:

Fig. 2 is a similar view but showing the valves in the positions for the press ram to perform manually controlled forging strokes.

Fig. 3 is a similar view showing the valves in the press neutral positions with all pumps unloaded.

Fig. 4 shows the valves in the positions where the pump ram is about to make its return stroke by pumping liquid into the return cylinders.

Fig. 5 illustrates the positions of the valves to permit the press ram to effect die forging in which each stroke of the ram is made at fast approach forging speed to maximum pressure permitted by the system with the return stroke effected under push-button control.

Fig. 6 shows an alternate position of the valves to effect die forging hereafter to be described.

Figure 1:
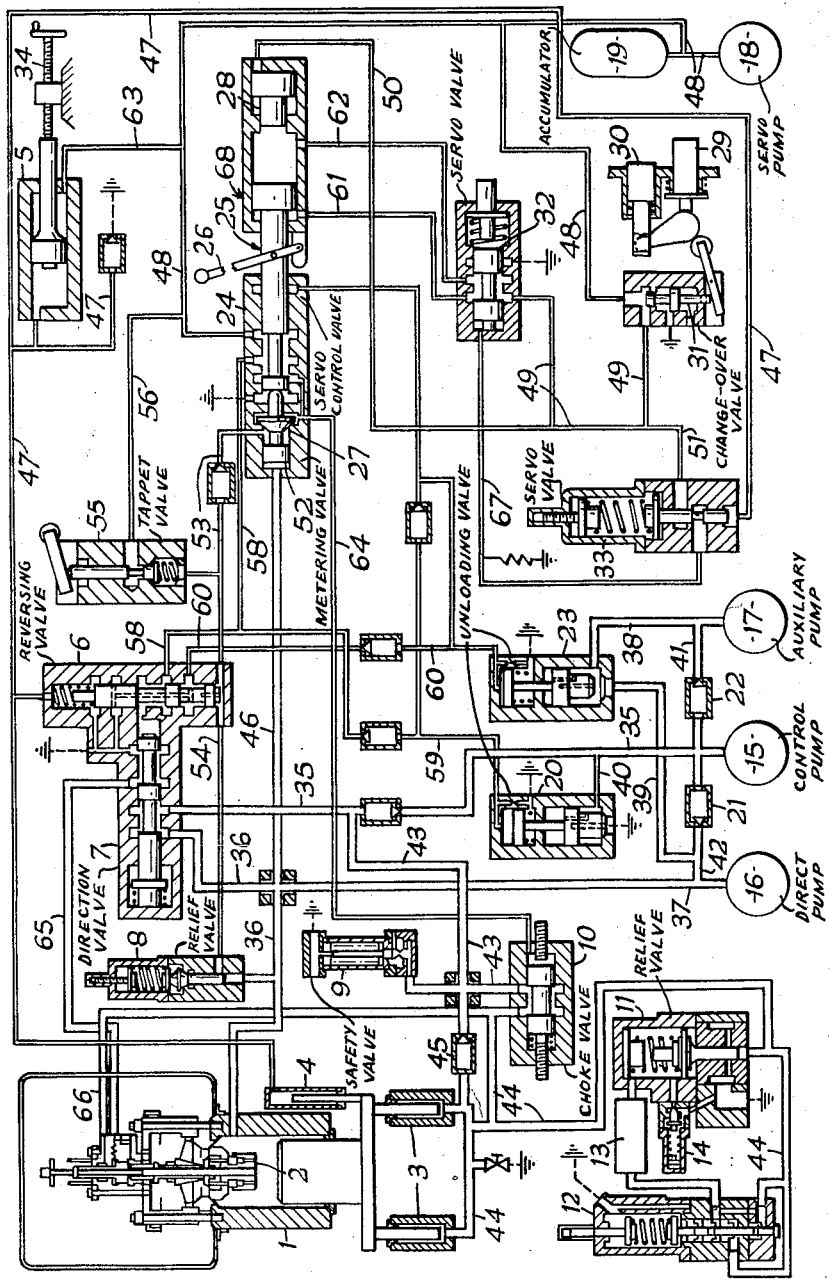
Fig. 1 shows the system with its valves in the positions to commence a cycle of operation during which the press ram performs rapidly and automatically repeated short planishing strokes.

Referring to the drawings and in particular to Fig. 1, the hydraulic press ram and cylinder are shown diagrammatically at 1 with the prefilling valve 2 and the push back cylinders 3. The displacement piston and cylinder 4 communicates with the reversing valve 6 and with a piston and cylinder 5. The displacement of piston and cylinder 5 is regulated by the adjustable screw stop 34 and this in turn regulates the length of the return stroke when operating on automatic planishing. In other words the displacement cylinder 5 regulates the length of the return stroke before the reversing valve 6 is actuated.

The directional control valve 7 is connected to the reversing valve as shown and there is a maximum pressure relief valve 8 which determines the maximum pressure at which the reversing valve will be actuated. There is also a safety valve 9 which is arranged to blow off if the maximum working pressure is exceeded in any condition of operation of the press. An automatic choking valve 10 is connected in the line to the push back cylinders 3 and its function is to regulate the speed of the approach stroke when the press ram is falling by gravity and the valve is in the open position shown in Fig. 1. Valve 10 is servo-pressure-actuated to open and spring-actuated to close. In the closed position the displacement of the push back cylinders is constrained to pass through the relief valve 11 so that the press ram is pumped down in opposition to the push back rams. The relief valve 11, 12, 13 is similar in construction to that described in United States application Serial No. 430,339, filed May 17, 1954, and it is fitted with an additional maximum pressure relief valve 14.

There are three sets of primary pressure pumps comprising control pump 15, direct pumps 16, and auxiliary pumps 17. The control pump 15 is connected by pipe 35 to the directional control valve 7 which controls the forward and return stroke of the press ram; pipe 36 connects the directional control valve with the main press cylinder and pipe 43, non-return valve 45 and pipe 44 connects the control pump to the push back cylinders which are always subject to pump pressure except during the gravity fall of the press ram on the approach stroke. When the press ram is falling by gravity liquid from the push back cylinders passes through pipe 44 through the open choke valve 10 back into pipe 43 and then through 35 and directional control valve 7 and pipe 36 to the press cylinder which is being filled from overhead tank through the open prefill valve 2. On the other hand, when the press ram is being pumped down on the slow approach or forging stroke, the choke valve 10 is closed and therefore pressure from the push back cylinders 3 passes along pipe 44 to the relief valve 11 and is discharged at maximum pressure. The choke valve 10 may be arranged to have three positions of the spindle so that flow from pipe 44 to 43 is completely closed, or partially choked or more fully choked, thereby providing three forward speeds of the press ram comprising forging speed, fast gravity approach, slow gravity approach.

The direct pumps 16 are in continuous communication with the press cylinder 1 by means of pipeline 37, 36 and therefore these pumps are loaded when the prefill valve is closed and unloaded when the prefill valve 2 is open. Liquid from the auxiliary pumps 17 may be directed to either the press cylinder 1 or to the push back cylinder 3 by means of the valve 23. Thus, when valve 23 is closed the liquid from the auxiliary pumps 17 is directed through pipelines 38, 41, non-return valve 22, pipeline 35 to pipeline 43 and through non-return valve 45 and pipe 44 to the return cylinders 3. On the other hand when valve 23 is open, the auxiliary pumps 17 deliver along pipe 38 through valve 23 to pipeline 39 and thence through pipes 37 and 36 to the press cylinder 1.

The servo system comprises a low pressure servo pump 18 and a small low pressure servo accumulator 19, a push-button operated change-over valve 31 and a push-button operated valve 32, a pressure operated valve 33, connected to the displacement plunger and cylinder 4 by the pipeline 47 and a servo control valve 24 which is manually operated by the lever 26 and also may be servo operated by the piston 25 and cylinder 68. When the changeover valve 31 is in the position shown in Fig. 1, servo pressure has access to valves 32 and 33 by way of lines 48, 49 and 51 and the hydraulic press can be push-button operated for closed-die forging work. On the other hand, when the changeover valve is reversed by pushing button 29 thereby isolating servo pressure line 48 from line 49 and placing line 49 in communication with exhaust, which also places the right hand end of cylinder 68 to exhaust through pipe 50, this permits the piston 28 to move to the right and allows the piston 25 of the servo control valve full movement. The servo valves 32 and 33 are also inoperative because they are also connected to exhaust by pipe 51 and 49.

The function of the piston 28 to the right of the servo control valve 24 is to provide a stop for the valve piston 25 in the neutral position when operating on push-button control for closed-die forging. Thus, when the valve 31 is changed over to put the push-button control out of action it also releases the stop piston 28 and then the piston 25 of the servo control valve is free and permits manual operation of the valve by lever 26 for planishing and forging work. At the left hand end of the servo control valve 24 there is a metering valve 27 having a piston 52 which is subject to the pressure in the press cylinder via pipe 46 and 36. Consequently, when metering valve 27 is pushed off its seat servo pressure is directed from the servo control valve along pipeline 53 to the reversing valve 6 and immediately reverses the movement of the press ram. The reversing valve 6 may also be actuated by overblow from the maximum pressure relief valve 8 along pipe 54 in order to reverse the motion of the press ram at maximum pressure. There is also a tappet operated valve 55 connected to the servo pressure line 48 by the pipe 56 and connected to the reversing valve 6 by pipe 53. The object of this tappet operated valve 55 is to reverse the press ram when it reaches a given position. The reversing valve 6 also directs servo pressure along pipe line 60 to valve 23 in order to direct liquid from the auxiliary pump either to the press cylinder or the push back cylinders as required for the forward or return stroke. Servo pressure is directed to the reversing valve 6 through pipe 58 by servo control valve 24 and by pipe 59 to close the unloading valve 20 to load all pumps and, when valve 24 is in "neutral" servo pressure is isolated from valve 20 which opens to unload all pumps through non-return valve 21 and 22 and pipes 35, 40. On planish return operation servo pressure is directed by valve 24 through pipe 58, valve 6 and pipe 60 to close valve 23 in order to direct liquid from the auxiliary pump through pipe 41, 35, 43 and 44 to push back cylinder 3.

Referring to the drawings, it should be understood that the spindle of valve 7 is moved to the right by a spring, and it is moved to the left by servo pressure in opposition to the spring. Similarly valve 6 is moved up by servo pressure in opposition to a spring which moves it downwards when the servo pressure is released. The spindle of valve 10 is moved to the right by the spring, and it is moved to the left by servo pressure in opposition to the said spring. The valves 20 and 23 are normally open, they are closed by servo pressure and they are opened again if the servo pressure is released or interrupted.

The hydraulic press is manually controlled by the lever 26 of valve 24. The valve lever 26 has four positions as follows:

(1) Lever held hard over the extreme left for planishing control.
(2) Forge.
(3) Neutral.
(4) Extreme right. Return.

The drawing Fig. 1 shows the valve lever 26 in the first position for planishing, and the other valves are in the respective positions for the planishing approach stroke of the press ram. It will be understood that the prefill valve will be opened by suction as the press ram falls, and that it will close automatically when the press tool contacts the work. The control lever 26 is held hard over to the left by the press operator. On the planishing approach stroke, the servo pressure flows from pipe line 48 to valve 24, pipe 58 to valve 6, which moves valve 7 to the left. Also pressure flows from valve 24 through pipe 58 and pipe 59 to valve 20 which is closed, and also from valve 24, pipe 64 to valve 10 holding it full over to the left, and thereby providing the maximum opening of the choke. The primary pressure flows from pump 15 through pipe 35 to valve 7 and thence through pipe 36 to the main cylinder. Pump 17 delivers through pipe 38 to valve 23 and pipes 39, 42, 37 and 36 to the main press cylinder. Pump 16 delivers through pipes 37, 36 to the main press cylinder. The return from the pushback cylinders passes through pipe 44, choking valve 10, pipe 43, 35, valve 7, pipe 36 to the main press cylinder. The prefill valve is open.

When the press ram meets the work, the prefill valve automatically closes, and pressure builds up in the press cylinder. The reversal of the press ram may be effected by maximum pressure valve 8 blowing off through line 54 to valve 6, thereby moving the reversing valve upwards, and allowing valve 7 to move over to the right. The same result may be achieved by the tappet operated valve 55 which receives servo pressure through lines 48 and 56 and, when a given position is reached and the tappet is actuated, to direct servo pressure through pipe 53 to the reversing valve 6. Alternatively the reversing valve may be actuated by the primary pressure from the main cylinder passing through pipe 46 to plunger 52 of valve 24, and when the set pressure in the main cylinder overcomes the pressure of the operator's hand on the lever 26, it will lift the metering valve 27 and permit servo pressure to pass through pipe 53 to the reversing valve, thereby moving the valve spindle 6 upwards and causing the valve spindle 7 to move to the right. Then the servo pressure flows through pipe 48 through valve 24, pipe 58, reversing valve 6, pipe 60 and closes valve 23. Valve 20 is also closed by servo pressure, and the position of valve 10 is the same. The primary pressure passes from pump 15 through pipe 35 to valve 7 and pipe 65 to the prefill valve causing the decompression valve to open and finally the prefill valve is opened. Pipe 66 is connected to pipe 44 and the arrangement is such that it is always subject to pressure. Primary pressure from pump 15 also passes through pipe 35 to pipe 43, non-return valve 45, pipe 44 to the pushback cylinders to effect the return stroke. Pump 17 delivers through pipe 38, 41 to non-return valve 22 and then to pipe 35 as above. Pump 16 delivers through pipe 37, 36 to the main cylinder and out through the open prefill valve. On the upward movement of the press ram, the displacement plunger 4 delivers through pipe 47 to the left hand end of the displacement cylinder and from thence to the top of the reversing valve 6, moving it downwards, and thereby causing valve 7 to be moved to the right, which starts the downward cycle of the press ram for another planishing stroke.

Fig. 2 shows the control valve lever 26 in the "forge" position and in this position there is no automatic reversal of the press ram because the servo pressure line 48 is isolated from line 53 by the piston of valve 24. The press ram may be reversed by maximum pressure or by tappet valve 55. The spindle of valve 24 isolates the servo pressure line 48 from pipe 64 to valve 10 and consequently valve 10 is closed by the spring moving the spindle to the right. The press ram is pumped down and the pushback cylinders discharge through line 44 through the relief valve 11.

Fig. 3 shows the control valve lever 26 in neutral position, and in this position servo pressure supplied through pipe 48 is isolated by valve 24 from the pipe 58, and pipe 58 is connected to exhaust which allows valve 7 to move right as shown. Servo pressure is also isolated from valve 20 and valve 23 which open to unload pumps 15, 16 and 17.

Fig. 4 shows the control valve lever in the return position, in which servo flow is directed through pipe 59 to close valves 20 and 23 to load the pump units. Here again line 58 is open to exhaust, and valve 7 is spring operated to the right as shown, and pump 15 delivers to pipe 35, valve 7 and pipe 65 to open the prefill valve and also via pipe 35, 43, valve 45 and pipe 44 to the pushback cylinders 3. Valve 23 also being closed, the delivery of pump 17 is constrained to pass through pipe 41, valve 22, pipe 35, pipe 43, valve 45 and pipe 44 to the pushback cylinders 3.

Fig. 5 indicates die forging conditions in which a single cycle consisting of fast approach forge to maximum pressure and return is effected by push button operation and this condition is selected by valve 31 actuated by push buttons 29 and 30 to admit or isolate pipe 48 from 49. For die-forging the valve lever 26 is removed. In die forge position servo pressure is directed by pipe 48, valve 31, pipe 49 to valve 32 and pipe 49, pipe 51 to valve 33 and pipe 49, pipe 50 to plunger 28. The start of the cycle would be push button actuation of valve 32 to the extreme left as shown in which servo pressure would be directed by pipe 49, valve 32 and pipe 62 to operate piston 25 to the extreme left as for planish position. The press operation would then be as described for Fig. 1 and reversal would be at maximum pressure effected by primary pressure overflow through valve 8 operating valve 6 to "up" position. Return movement would be as described for Fig. 1, but in this case the displacement plunger 4 would first deliver liquid to the displacement cylinder 5 pushing the plunger to the right against servo pressure entering by way of pipe 63. Pressure built up when the plunger contacts stop 34 would then react through pipe 47 to open valve 33 allowing servo pressure to flow through pipe 51, valve 33 and pipe 67 to the valve 32 to operate the valve 32 to its alternate position.

Fig. 6 shows this alternate position in which pipe 62 is connected to exhaust and servo pressure feeding through valve 32 and pipe 61 to the annulus of piston 25 operates the valve 24 to neutral position as shown and unloading the pumps as previously described and completing the operating cycle. The neutral position being determined by piston 28 and this is held in the position shown by servo pressure directed through pipes 49 and 50.

What is claimed is:

1. A control system for a hydraulic press having a ram with a prefill valve adapted to be operated to permit the exhaust of fluid from the ram for a return stroke, said control system comprising, in combination, a directional control valve having a movable member spring biased toward one position and adapted to be shifted to an alternate position by fluid pressure, conduit means connecting said directional valve with the prefill valve, said directional control valve being operative when its movable member is shifted to its spring biased position to direct pressure fluid to the prefill valve to operate the same, a reversing valve having a movable member spring biased to one position and adapted to be shifted to an alternate position by fluid pressure, conduit means connecting said reversing valve with said directional control valve, said reversing valve being operative when its movable member is in said one position to direct pressure fluid to said directional control valve to operate the same to its alternate position, and means for controlling the supply of pressure fluid to said reversing valve, both of said valves returning to their spring biased positions to condition the control system for the beginning of another operating cycle upon interruption of the pressure fluid supply to the valves.

2. A control system as defined in claim 1 including means operative in the return movement of the press ram for supplying fluid under pressure to the reversing valve to assist the biasing spring of the valve to maintain the movable valve member in its spring biased position.

3. A control system for a hydraulic press as defined in claim 1 in which the press is provided with a push back cylinder and piston and in which a choke valve is connected in the control system to regulate the rate of flow of fluid from the push back cylinder as the press ram executes its approach stroke.

4. A control system for a hydraulic press as defined in claim 1 in which pressure fluid for operating the ram is supplied by pumps, an unloading valve connected with each pump operative to load and unload the pump, and a manually operable servo valve for controlling the operations of the unloading valve.

5. A control system as defined in claim 1 including a source of fluid under relatively low pressure, and a manually operable servo control valve operable to control the supply of fluid from said source to the directional control valve.

6. A control system as defined in claim 5 including a push button operated control valve, and a selector valve operable manually to place the directional control valve under control of either the servo control valve or said push button operated valve.

7. A control system as defined in claim 3 including an auxiliary pump, and a pressure fluid operated valve controlled by the reversing valve for directing fluid from said auxiliary pump to the press ram or the push back cylinder selectively.

8. A control system as defined in claim 5 including fluid operated means urged in a direction to oppose the pressure exerted manually to operate the servo valve, and fluid connections for directing fluid to said fluid operated means at the pressure prevailing in the ram.

9. A control system as defined in claim 5 including pressure fluid operated means for limiting the operative movement of the servo valve in one direction, fluid connections for supplying pressure fluid to said fluid operated means in parallel with the press ram, and valve means operable in accordance with a pressure value determined by the position of the servo valve for reversing the movement of the press ram.

10. Control means as defined in claim 1 including a manually operable servo valve, and fluid connections controlled by the servo valve for directing impulses of pressure fluid to the reversing valve for operating the same.

11. Control means as defined in claim 1 including valve means operable by the press ram in its advance for controlling the delivery of pressure fluid to the reversing valve.

12. A control system as defined in claim 1 including a relief valve adapted to blow off when the pressure in the hydraulic system exceeds a predetermined value, and connections for delivering fluid from said relief valve to the reversing valve to operate the latter.

References Cited in the file of this patent

UNITED STATES PATENTS

| | | |
|---|---|---|
| 2,534,966 | Geiger et al. | Dec. 19, 1950 |
| 2,568,030 | Stacy | Sept. 18, 1951 |
| 2,577,981 | Stacy | Dec. 11, 1951 |
| 2,615,302 | Camerota | Oct. 28, 1952 |
| 2,780,918 | Rohrscheib | Feb. 12, 1957 |